United States Patent [19]

Rissanen

[11] Patent Number: 4,700,718
[45] Date of Patent: Oct. 20, 1987

[54] THRESHING METHOD AND EQUIPMENT INTENDED FOR ITS APPLICATION

[75] Inventor: Vilppu U. Rissanen, Mutainen, Finland

[73] Assignee: Oljynpuristamo Oy, Helsinki, Finland

[21] Appl. No.: 866,987

[22] Filed: May 19, 1986

Related U.S. Application Data

[63] Continuation of Ser. No. 652,960, Sep. 21, 1984, abandoned.

[30] Foreign Application Priority Data

Sep. 23, 1983 [FI] Finland ................................. 833408

[51] Int. Cl.⁴ ............................................. A01F 12/44
[52] U.S. Cl. ................................... 130/27 R; 56/14.6; 130/27 T
[58] Field of Search ............ 56/14.6; 130/27 R, 27 H, 130/27 HF, 27 HA, 27 J, 27 T, 27 Z

[56] References Cited

U.S. PATENT DOCUMENTS 3,087,499 4/1963 Carmichael, Jr. et al. ....... 130/27 R
3,703,802 11/1972 Wrestler et al. .................. 130/27 R
4,164,947 8/1979 Wilson ........................... 130/27 HA
4,178,942 12/1979 Nusser ............................. 130/27 T
4,467,818 8/1984 Donaldson et al. ............... 130/27 T

*Primary Examiner*—Stephen J. Novosad
*Assistant Examiner*—William P. Neuder

[57] ABSTRACT

The invention concerns a threshing method and the threshing equipment needed in its application which operates as part of a combine harvester working in the field. Threshing is performed by means of a roll (12) rotating about its axle shaft (11) and the flail bridge (13) composed of a cylinder (14), by guiding the material to be threshed into the space between the roll and the cylinder and by gathering the seeds separated by the flail bridge from the axially transferred vegetable material in that space. It is fundamental to the invention that during threshing the cylinder (14) with which the flail bridge (13) is composed is rotated in the opposite direction to the rotation of the roll (12). In order to clean the seeds separated during threshing a rotating drum screen (16) can be located outside the flail bridge cylinder (14). The invention is intended especially for the harvesting of sunflower seeds but it can also be applied for the harvesting of other cultivated crops, for example grain harvesting.

5 Claims, 4 Drawing Figures

THRESHING METHOD AND EQUIPMENT INTENDED FOR ITS APPLICATION

This application is a continuation of application Ser. No. 652,960, filed Sept. 21, 1984 now abandoned.

The subject of this invention is a threshing method for separating the seeds from the other parts of plants, in which method the separation is carried out by means of a cylindrical roller rotating about its axle shaft and with a cylinder surrounding the roller composing a flail bridge, by guiding the material to be threshed into the space between the roller and the cylinder, where the material is moved through axially and by taking up the seeds separated through the flail bridge outside the cylinder.

In threshing with a combine harvester the crop plant is usually cut through the stem, affer which the part cut off is guided into the space between the rotating roller and the flail bridge, where the separation of seeds from other parts of the plant is carried out. The flail bridge is fundamentally a screenlike element which strikes through the loosening seeds while simultaneously the stem and other remaining parts are moved under the influence of the rotational motion of the roller to conveyors, which after a possible further seed separation stage are removed from the threshing machine.

The rotating roller and the flail bridge opposing it are in most combine harvestors located transversely to the feeding direction of the material to be threshed. Thus the fundamental threshing stage which loosens the seeds is left short and the conveyors transferring the threshed material must have the capacity to take out unseparated seed before the material leaves the harvester. On the other hand there are certain known harvesting machines in which the roller and the cylindrical flail bridge are located internally, so that the material to be threshed is transferred axially in the space between them. In these types, known as härvesters operating on the axial flow principle, the material to be threshed is noticeably longer in contact with the rotating roller and the flail bridge, so that the loosening of seeds is more efficient and furthermore the material processing can be carried out more gently.

Grain harvesting with the well-known combined harvesters of today is relatively trouble-free. However difficulties are met when harvesting other cultivated plant crops in which the separation of seeds from the other parts of the plant tend to remain intact during threshing and cannot be performed so easily. For example the harvesting of sunflower seeds by combined harvester in Nordic conditions is not successful, this being caused by the flower heads which remain moist and tend to cause blockage of the flail bridge. In harvesters, in which the rotating roller and the flail bridge are located transverse to the direction of the material feed, blockage of the flail bridge is fairly certain and in addition to this, threshing causes breakage of the seeds. In harvesting with harvesters operating on the axial-flow principle these problems are lesser but because of the need of high efficiency and because of the danger of blockage at the flail bridge, harvesters operationg on this principle do not provide a satisfactory answer to the harvesting of sunflower seeds.

In the FI Patent 812221 a solution is presented for gathering sunflower seeds. The solution is based on cutting the sunflower head horizontally below the seeds so that the seeds and the floral axes are separated from each other. This method in itself is fully operation al, but in practice an inherent problem has proved to be getting the flower heads in the right attitude relative to the cutter which will perform cutting. For this reason the method has not fulfilled the prospects which were hoped for it.

The purpose of this invention is to provide a threshing method operating on the axial flow principal with which the threshing can be carried out more efficiently than before and which also makes possible the harvesting of sunflower seeds and other cultivated crop plants which are difficult to process. It is characteristic to the threshing method according to the invention that the flail bridge which is composed by the cylinder outside the roller is rotated during threshing in the opposite direction to the rotational direction of the roller.

In threshing in accordance with the invention, the roller and the flail bridge are most suitably rotated so that the rotational speed of the roller is noticeably higher that that of the flail bridge. The revolution speed of the roller can thus be for example, 5–15 times greater than that of the cylinder.

An advantage is achieved with the invention which results in improved threshing efficiency at a lower rotational speed than before whereby energy needs are essentially reduced. In addition the rotation of the cylinder of which the flail bridge is composed, means that the whole surface of the cylinder can be utilized efficiently in separating the seeds. This is the fundamental difference in comparison with combine harvesters operating on the axial flow principle, in which the cylinder remains in place and only a small part of its surface can make up the flail bridge used for separating the seeds.

It follows from the lower rotational speed of the roller and from the greater surface area of the flail bridge that the threshing can be carried out more gently than before and that the tendency of the flail bridge to become clogged is less than before. Preliminary tests indicated that by using this method the harvesting of sunflower crops in Finnish conditions can be carried out without choking of the flail bridge. In addition to this it is obvious that this method can be used for example in harvesting peas which need gentle handling, for freezing, and that the invention also offers advantages when applied to the harvesting of normal grain crops.

In one advantageous form of the invention the seeds separated outside the cylinder are cleaned with a drum screen, which is located outside the cylinder and which is most suitably rotated simultaneously with the roller and cylinder. In both known threshing methods and in the threshing method according to the invention the seeds separated by the flail bridge require cleaning, and with the location of the drum screen in accordance with the invention the separation of seeds and the subsequent cleaning can be carried out more compactly than before within the equipment construction.

The drum screen can be furnished if needed with a brush roll located against its surface and also with a screw in the inside surface of the drum screen or in the brush roll, in accordance with the FI Patent 821229.

The subject of the invention embraces not only a threshing method but also threshing equipment designed for the application of the above described threshing method and which includes a roller rotating about its axis and a cylinder surrounding the roller and composing a flail bridge and in which the material to be threshed is arranged to be fed axially into the space between the roller and the cylinder. It is characteristic of the equipment according to the invention that the cylinder composing the flail bridge can be rotated in the opposite rotational direction to that of the roller.

The invention is described more fully in the following detailed description with the aid of more detailed examples and by referring to the accompanying drawings in which FIG. 1 illustrates a combine harvester in part sectional view which is furnished with threshing equipment in accordance with the invention.

Figure 1:
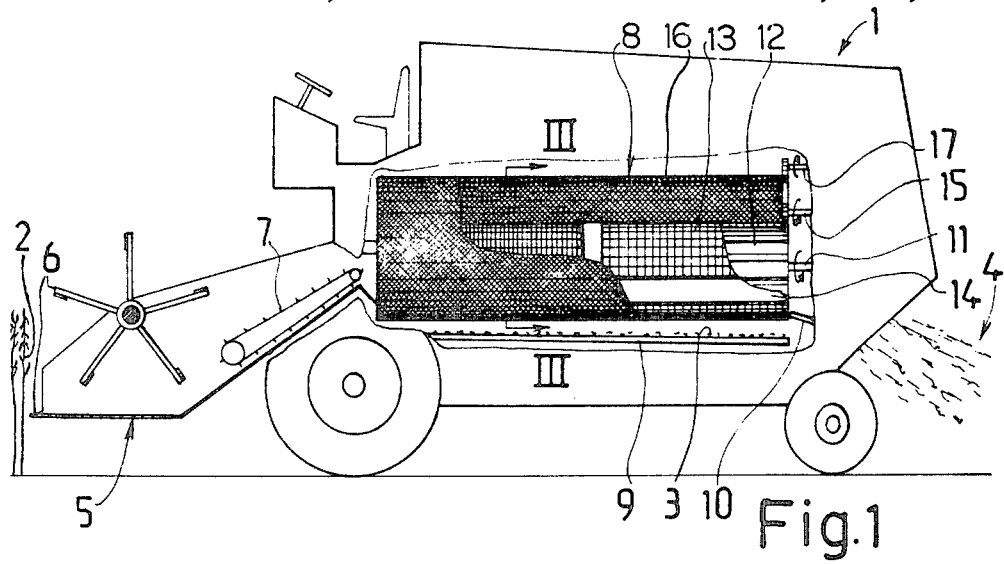

In FIG. 1 a combine harvester 1 for field operation is illustrated. It carries out harvesting by cutting the plant 2 off at its stem, separating the seeds 3 from the cut part of the plant and returning the stems and other remaining parts 4 to the field. The harvester 1 consists of a cutting table 5, which is equipped with elements 6 to cut the plant, a conveyor 7 to transfer the plants forward into the threshing stage and screening equipment 8 for separating and cleaning the seed and also conveyors 9 and 10 for the transfer or cleaned seeds 3 into storage space and for removing the remaining vegetable parts 4 from the harvester, respectively.

Figure 2:
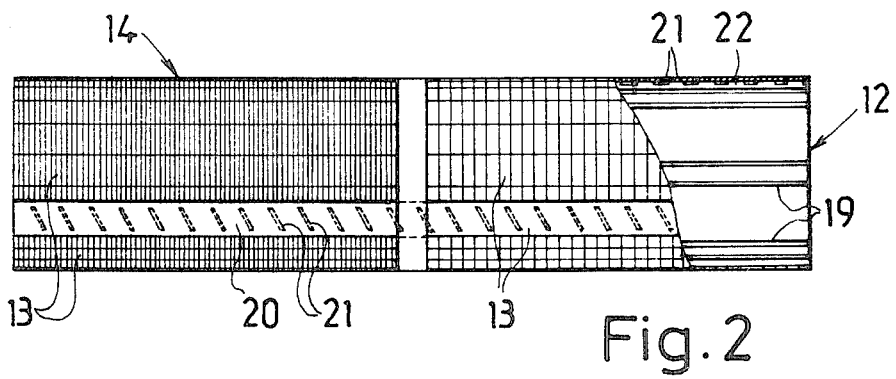
FIG. 2 illustrates the flail bridge and the cylinder from which it composed and the roller inside it, included in the equipment shown in FIG. 1.
Figure 3:
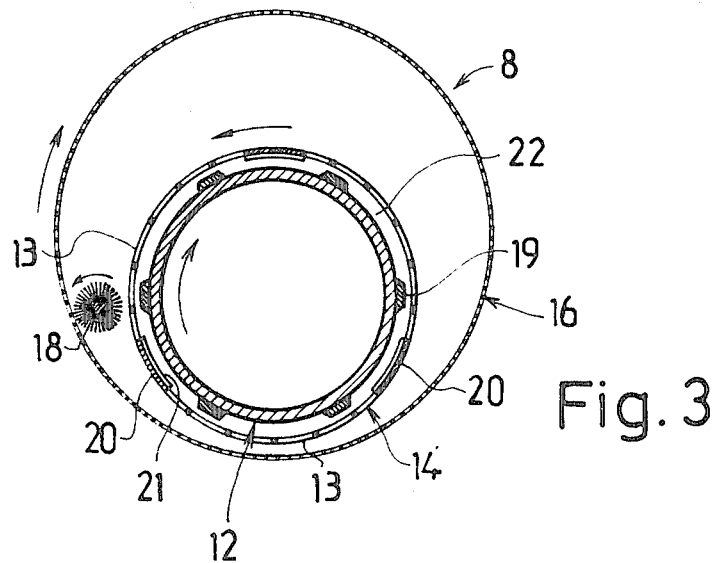
FIG. 3 illustrates roller, cylinder and the drum screen surrounding them shown along the section III—III in FIG. 1.

The structure 8 of the threshing and screening equipment incorporated in harvester 1 according to FIG. 1 becomes plainer from FIGS. 2 and 3. The threshing equipment consists of a central hollow cylindrical roller 12 rotating about its axle shaft 11 (FIG. 1) and a surrounding cylinder 14 furnished with flail bridges 13, the cylinder of which also rotates about its axis, but in the opposite direction relative to the rotational direction of the roller 12. The rotating means 15 for the cylinder 14 can be seen in FIG. 1. The screening equipment, which cleans the seeds separated in threshing is composed of a cylindrical rotatable drum screen 16, surrounding the cylinder 14, the rotating means 17 for which can be seen in FIG. 1. Against the drum screen 16 internal surface a brush roll 18 is located according to FIG. 3, rotating in the opposite direction to the screen rotation. The purpose of the brush roll is to prevent the material to be screened from adhering to the screen surface. Drum screen 16 rotates in a direction opposite to that of cylinder 14, as shown in FIG. 3.

The separation of the seeds during threshing is achieved by the flails "19 axially disposed on the outer periphery of roller 12" opposing these flails 19 are the flail bridges 13 which are part of the cylinder 14 and which are screen-like elements formed of longitudinal and transverse ribs between which the separated seeds run out from the cylinder. Besides the flails 13 the cylinder 14 consists of closed parts 20, the internal parts of which are equipped with slanting rib-like projections 21. These projections 21 operate as elements which, as the roller 12 and cylinder 14 rotate, transfer the material to be threshed axially into the space 22 between the roller 12 and cylinder 14 and toward the rear end of the threshing equipment. In the equipment according to the drawing, cylinder 14 has been constructed so that it is composed of three flail bridges 13 in the cylinder axial direction and of three closed parts 20, equipped with projection 21, this arrangement being best seen at FIG. 3. The extent of the surface area of cylinder 14 occupied by the flail bridges is most suitable when it is at least 50%, but as in the case of the example in FIG. 3 may be considerably more than that.

The proposed combine harvester 1 with its threshing and screening equipment 8 can be used for example for harvesting of sunflower seeds, when the harvester separates the seeds from the flower stem and floral axes. In threshing a suitable rotational speed of the roller 12 is about 100–300 r/min and the rotational speed of cylinder 14 about 1/10 of that. However the thresher 1 can also be used for harvesting of other cultivated plants, for example for threshing of normal grain where the rotational speeds of the roll 12 and cylinder 14 can be noticably higher.

Figure 4:
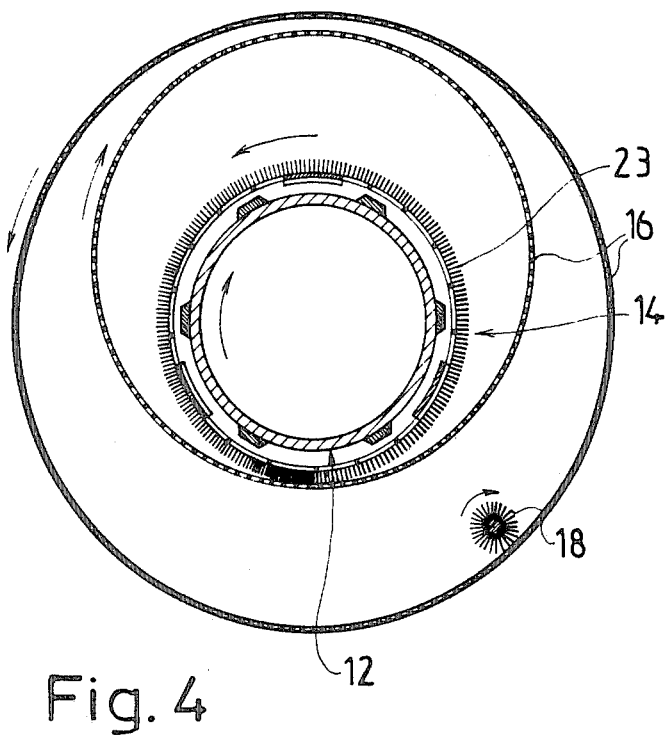
FIG. 4 illustrates another threshing equipment in accordance with the invention similar to the sectional view in FIG. 3.

In FIG. 4 another mode of application of the invention is presented, in which two drum screens (16) surround the roller 12 and the cylinder 14 equipped with its flail bridges. The inner drum screen is located eccentrically to the roller 12 and cylinder 14 and the outer drum screen is further eccentric to the inner drum screen so that it is concentric with the roller 12 and cylinder 14. The rotational directions of the roller 12, the cylinder 14 and the drum screen 16 are shown in FIG. 4 by means of arrows. To keep the inner drum screen clean the external surface of the cylinder 14 is equipped with a spirally formed brush 23, which when the screen and the cylinder are rotating wipes the internal surface of the screen and simultaneously transfers the screen waste axially towards the rear end of the harvester. The cleaning of the outer drum screen is carried out by the rotating brush roll 18 located against internal surface of the screen.

In the equipment according to the illustration of FIG. 4 it is particularly essential that the outer drum screen is closer meshed than the inner. It is thus possible to carry out the breaking down of the material to be handled into small pieces with the equipment. The mesh of the screens 16 can be chosen according to need and if wanted there can be more than two inner screens surrounding the roll and cylinder. In this solution it is only essential that the equipment is a unit of compact cylindrical form with which breaking up of the plants can be achieved without auxiliary equipment located beneath or to the rear of the main equipment.

It is clear to the professional person in this field that the various modes of application of the invention are not limited to the examples given here, but that they can vary within the limits of the accompanying patent claims.

I claim:

1. Apparatus for threshing plant material to separate seeds therefrom, comprising a central cylindrical roller which is rotatable in one direction and provided with flails on its outer periphery, a hollow flail bridge cylinder which is rotatable in a direction opposite to that of said central roller, said flail bridge cylinder cooperating with said flails on said central roller to separate seeds from said plant material and to define an annular space therebetween; means for rotating said central roller and said flail bridge cylinder in opposite directions with the rotational speed of the roller being greater than the rotational speed of said cylinder, means for axially feeding said plant material into said annular space, means for gathering seeds separated by the opposed rotation of said roller and cylinder, an outer rotatable cylindrical drum screen surrounding said flail bridge cylinder for cleaning the seeds separated through said flail bridge cylinder, a rotatable brush roll located against the inner surface of the screen, and screw means provided in said screen for axially transferring screen waste towards the rear of said screen.

2. Apparatus according to claim 1, wherein said flail bridge cylinder comprises alternate flail bridge portions with openings for passage of seeds therethrough and closed portions carrying radially inwardly directed means to transfer plant material in said annular space axially from the feed end to the discharge end thereof.

3. Apparatus according to claim 2, wherein said flail bridge cylinder comprises at least two flail bridge portions separated by closed portions, respectively, extending axially along said flail bridge cylinder.

4. Apparatus according to claim 3, wherein the extent of the surface area defined by the flail bridges collectively in the flail bridge cylinder is at least 50 percent of the total surface area of said cylinder.

5. Apparatus according to claim 1, wherein a second rotatable drum screen surrounds said first rotatable drum screen, said first rotatable drum screen being mounted eccentrically with respect to said roller and flail bridge cylinder, and said second drum screen being mounted concentrically with respect to said roller and flail bridge cylinder.

* * * * *